UNITED STATES PATENT OFFICE.

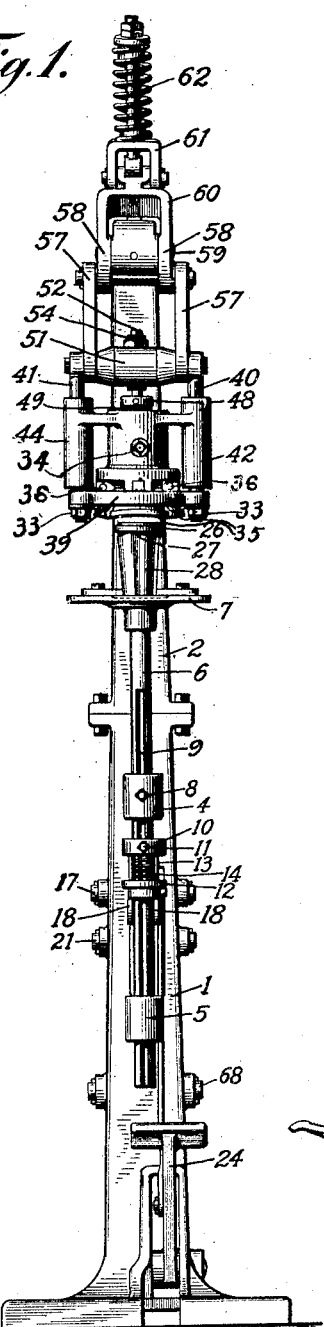
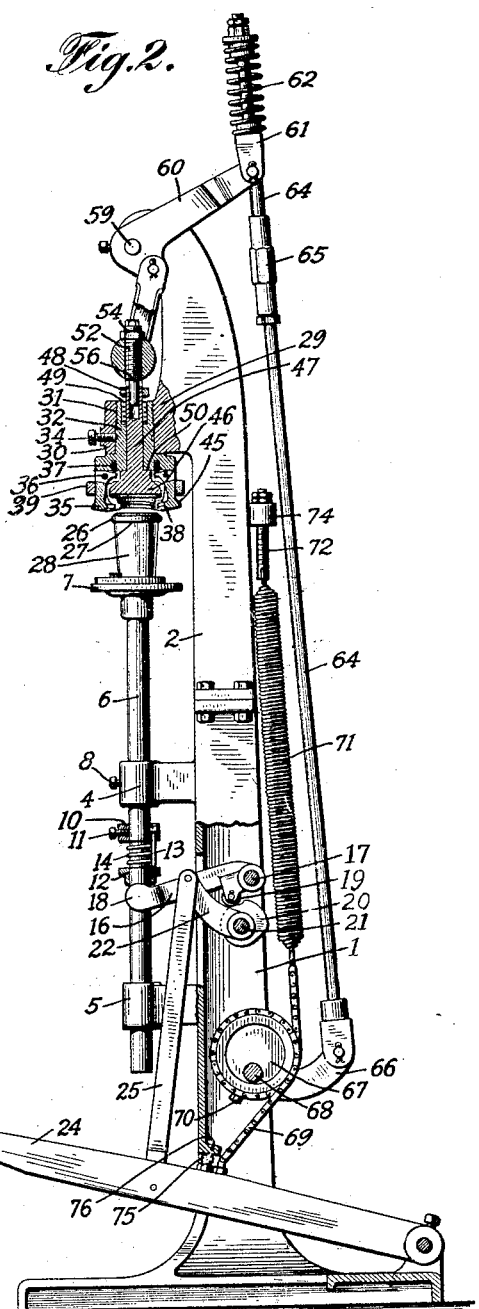

FREDERICK G. WIELAND, OF BROOKLYN, NEW YORK, ASSIGNOR TO ANCHOR CAP & CLOSURE CORPORATION, OF BROOKLYN, NEW YORK, A CORPORATION OF NEW YORK.

FOOT-POWER SEALING-MACHINE.

1,367,575.      Specification of Letters Patent.      Patented Feb. 8, 1921.

Application filed January 9, 1919. Serial No. 270,266.

*To all whom it may concern:*

Be it known that I, FREDERICK G. WIELAND, a citizen of the United States, residing at Brooklyn, in the county of Kings, State of New York, have invented certain new and useful Improvements in Foot-Power Sealing-Machines, of which the following is a specification.

The present invention relates to sealing machines and more particularly to a machine for affixing a cap on a glass container or the like by forming a side seal between the skirt of the cap and the side wall of the container.

An object of the present invention is to provide a machine constructed to operate quickly and efficiently with small expenditure of power to produce the side seals as specified, by deforming a bead in the skirt of the cap to compress gasket material against the side wall of the container.

A further object of the present invention is a machine operating as specified and wherein the package table is operated by quick movement mechanism to position the cap to be sealed beneath the sealing chuck and wherein the sealing chuck devices are operated under an increasing power factor to complete the sealing operation when the cap has been positioned within the zone of operation of the sealing chuck.

A still further object of the present invention is a machine of the character specified and wherein the package table with the package thereon is raised to position the cap to be sealed by a quick movement, and wherein the sealing devices are operated under an augmented power factor, both of which operations are accomplished by a single operation of a foot actuated mechanism.

A still further object of the present invention is a machine of the character specified and wherein the range of movement of the sealing chuck is adjustable.

A still further object of the present invention is a device of the character specified and wherein both the sealing jaws and the anvil of the sealing chuck are independently adjustable in their respective sealing movements.

A still further object of my invention is to provide a construction which is particularly strong and simple, and in which substitution of sealing chucks may be made quickly and easily, in order to accommodate the machine to the sealing of containers of various size.

A still further object of the present invention is to provide powerful leverage arrangements for completing the sealing movements of the sealing chuck and which leverage arrangements comprise a toggle operative through a driving member and connections, and wherein the driving member comprises an eccentric driven from a flexible member secured to a foot lever and in peripheral engagement with the eccentric.

Another object of the present invention is a sealing chuck in a machine of the character specified and wherein the swinging jaws of the chuck are pivoted upon a stationary base member attached to the machine frame in such manner that the swinging jaws do not have a vertical movement and wherein the anvil is vertically movable to distort the bead in the skirt of the cap thereby producing the seal against the side wall of the container.

This invention possesses many other and advantageous features, some of which, together with the foregoing, will be set out more at length in the following description, wherein will be outlined in full that form of the invention which I have selected for illustration in the drawings accompanying and forming a part of the present specification.

In the drawings and specification I have described only the preferred form of my generic invention, and it is to be understood that I do not limit myself to such form because my invention may be embodied in a multiplicity of forms each being a species thereof, it being understood that by the appended claims I desire to cover the invention in whatsoever form it may be embodied or practised.

Figure 1 is a front elevational view of the preferred form of the machine embodying my invention.

Fig. 2 is a side elevational view showing portions broken away to illustrate sections of the operating mechanism.

In the art of packaging or sealing foodstuffs, it is important that the sealing operation be carried out with the greatest rapidity possible without interfering with the operations of the machine or without spilling the contents of the container or displacing the cap therefrom. I have found that by providing certain accelerating mechanisms for positioning the package, and certain negative accelerating mechanisms for accomplishing the sealing, that the speed of operations of sealing machine may be greatly increased. In machines of this character, the parts receiving the heaviest wear are the portions of the sealing chuck which are actively engaged in the sealing operation, and, therefore, these parts of the sealing chucks must be renewed with greater frequency than other elements in the machine. Furthermore, in order to afford the user the full benefit of a machine of this type, it is necessary that provision be made for the substitution of different sized chucks in the machine in order to permit the sealing of packages of different sizes. To the accomplishment of these purposes I have found it desirable to construct the sealing chucks so that the swinging jaws and the beading anvil may be independently adjustable and independently removable, and to arrange the machine frame, operating mechanism and chuck in such manner that the latter may be removed from association with the frame and operating mechanism without disassembling either the chuck or the operating mechanism.

More specifically, the preferred embodiment of my present invention comprises a machine frame having a foot lever mounted in the base thereof, and a sealing chuck fixedly mounted on the upper portion of the frame with a vertically movable table beneath the sealing chuck. Accelerating movement devices comprising suitable levers and cams connect the table with the foot lever so that when the foot lever is depressed the package is quickly raised. Suitable adjustments are provided so as to accommodate packages of varying heights so that the cap will be properly positioned in the sealing chuck when the package is raised. A sealing anvil is mounted for movement within the sealing chuck and is also connected to the foot lever through a toggle connection and adjustable link devices which are operated through a chain driven eccentric also connected to the foot lever. By means of this construction wherein the chuck is mounted on a machine frame it will be seen a very rigid abutment is provided for holding the under portion of the bead on the skirt of the cap when the sealing anvil is operated through the negative accelerating element to make the seal as specified.

From the foregoing it will be apparent that the sealing operation takes place near the lower portion of the stroke of the foot lever at the time when the operator is naturally applying the greatest pressure to the latter; and that this operation is carried out by negative accelerating connections so that full advantage is taken of the momentum of the moving parts whereby the sealing operation is effected without unduly slowing up the operation of the machine and with minimum fatiguing effort on the operator.

Referring more particularly to the drawings for an illustration of the preferred embodiment of my invention, the machine therein illustrated comprises a machine frame base 1 to which is bolted the machine frame head 2. This construction facilitates shipping and repairing of the machines. The front of the base 1 is provided with a pair of bearings 4 and 5 in which is slidably mounted a standard 6 for a package table 7. The bearing 4 carries a set screw 8 which slides in a groove 9 in the standard 6 and prevents displacement of the table 7 by preventing the rotation of the standard 6. A collar 10 is mounted on the standard 6 beneath the bearing 4 and is adapted to be clamped in adjusted positions by means of a set screw 11. A second collar 12 is also carried by the standard 6 and beneath the collar 10 with a coiled spring 14 between the two collars and a tie bolt 13 extending through the collar 10 and into the collar 12 and effective to limit separation of said collars, so that a sudden release of pressure on the coiled spring 14 does not unduly displace the standard 6. A lift lever 16 is pivoted on a shaft 17 journaled in the main frame 1 and is bifurcated on its front end to provide arms 18 that extend on each side of the standard 6 and engage the slidable collar 12 so that when the lift lever 16 is operated, as will be described, the movement is transmitted to the standard 6 through the coiled spring 14, which absorbs undue shocks, etc. The lift lever 16 adjacent the shaft 17 is provided with an anti-friction roller 19 which roller bears against a cam 20 that is carried on a stub shaft 21 which is mounted in the base frame 1. This cam 20 is adapted to be rotated through the medium of an arm 22 secured to the shaft 21 and connected to the pedal 24 by means of a link 25.

From the illustration it will be seen that the cam 20 is of such size and contour that when the foot lever is depressed, this cam lifts the package table through the lift arm 16 and connected parts, with an accelerating movement. At the same time this movement is transmitted through the spring 14 so that the beading 26 of the cap 27 on the container 28 will not be brought into too violent contact with the sealing devices.

The machine frame head 2 is provided with a forwardly extending shelf 29 which is formed to comprise a boss 30 provided with a vertical opening, the upper portion of which is screw threaded as at 31 and into which the frame 32 of the sealing chuck is adapted to be secured. The front wall of the boss 30 carries a set screw 34 which is adapted to be seated against the stem of the frame 32 of the chuck to securely hold the chuck in position. This frame 32 of the chuck carries a plurality of swinging jaws 35 that are pivoted as at 36 and are normally swung outwardly by means of small coiled springs 37. These jaws are provided with ledges 38 which form a complete ring beneath the bead 26 of the cap when the jaws are swung to their innermost position as will be specified later. The movement of the jaws is controlled by means of a sliding ring 39 which is mounted by means of the removable nuts 33, on the lower ends of the sliding rods 40 and 41 that are vertically movable in the bearings 42 and 44 integral with the boss 30. The outer lower ends of the swinging jaws 35 curve outwardly as at 45 to comprise cam faces with which the sliding ring 39 coöperates when the sliding rods 40 and 41 are driven downward, as will be described, and cams the swinging jaws 35 inwardly. The sealing anvil comprises a circular sealing head 46 preferably formed integral with the stem 47 which extends through an opening in the chuck frame 32. The upper end of the stem 47 carries a collar 48 and the upper portion of the chuck frame is raised to provide a pocket for receiving a coiled spring 49 which bears against the collar 48 and normally retains the shoulder 50 on the sealing head in contact with the lower portion of the chuck frame. The sliding rods 40 and 41 are connected and carry a spacing yoke block 51 upon which is mounted an adjustable screw bolt 52 which is locked in adjusted positions by means of a lock nut 54. The lower end of the screw bolt 52 is cylindrical and extends within an opening in the stem 47 of the anvil to form a guide. The bolt 52 constitutes an actuating plunger with the shoulder 56 on the screw bolt arranged for coöperation with the upper end of the anvil stem, so that by adjusting the screw bolt 52, both the amount of movement communicated to the anvil and the time or instant at which this movement begins, may be varied. The oppositely arranged parallel links 57 are connected at their lower ends with the sliding rods 40 and 41 and at their upper ends with the short arms 58 of the bifurcated bell crank lever, which is pivoted upon the shaft 59, journaled in the upper end of the main frame head 2. The short arms 58 and the parallel links 57 comprise a toggle mechanism for operating the sealing chuck and anvil as will be described later. The long arm 60 of the bell crank lever carries a yoke 61 which supports a stiff compression spring 62 that is attached to the main operating rod 64 which preferably is formed in two sections that are joined by a turn buckle 65. The lower end of this operating rod 64 is connected to a power arm 66 which is fixed to rotate with the eccentric 67 that is mounted upon the stub shaft 68. A flexible chain 69 extends around the eccentric 67 and is secured thereto by a stub bolt 70. One end of this flexible chain is attached to the pedal 24 and the other end is attached to the main return spring 71. This spring 71 is anchored to an adjustable screw bolt 72 which is secured to the boss 74 on the machine head frame 2.

The main return spring 71 retains the foot pedal 24 normally in a raised position with the adjustable stop 75 in contact with the shelf 76 in the base of the main frame 1. It is to be noted that the eccentric 67 is so located relatively to the stub shaft 68 and the point of anchorage of the chain 69 to the foot pedal 24 that when the foot pedal starts on its downward travel the chain is operative on a relative short radius, which radius gradually increases as the eccentric is turned, thereby increasing the effective power of the pedal on the main operating rod 64, and it is also to be noted that the toggle formed by the parallel links 57 and the short arms 58 on the bell crank straightens as the main operating rod is pulled downward. As a consequence, the effective downward movement of the sliding rods 40 and 41 and the sliding link 39 is a movement which gradually decreases in speed with a corresponding increase in power.

In the operation of this machine the package is placed on the package table 7 and the pedal 24 is forced downward. This action causes the package table to be lifted quickly so that, the standard having the proper initial adjustment, the bead of the cap on the container thereon is raised above the ledges 38 on the swinging jaws 35. As this operation is being completed, the sealing mechanism has begun to operate so that immediately after the cap is positioned within the chuck the ring 39 is forced downward by means of the toggle mechanism and connected parts so that the ledges 38 on the chuck form a complete ring beneath the bead 26 of the cap, and the continued downward movement of the pedal forces down the sealing head 46 so that the bead 26 of the cap is suitably deformed by compression between the ledges 38 and the sealing head. As soon as the pressure on the pedal is relieved the return spring 71 operates to restore the parts to normal position so that the package may be removed from the table and a new container and cap be placed thereon for the next sealing operation.

The machine whose construction and operation has been described above provides a very simple device in which all parts are easily accessible for the purpose of repair, and which, while delivering very great power to the die parts which operate upon the package closure, is operated with but little exertion on the part of the user. The die operating and retaining mechanism is of particular strength and simplicity, and designed to necessitate but very little wear upon the bearings, as the rods 40 and 41 are retained in accurate alinement by the rigid connections afforded by the yoke bar 51 and the ring spider 39. Dismounting of a chuck from the machine and remounting of another chuck, as is frequently desired for the purpose of sealing different sizes of vessels, is easily accomplished in minimum time by simply backing off set screw 34 to release the chuck and to permit its downward withdrawal from the boss through the ring 39. A chuck having different size die parts may be quickly substituted by a reversal of these operations. As described above, the adjustment of the turn buckle 65 permits the variation of the stroke of the actuating mechanism to accommodate it to different chucks, while the adjustment of the bolt 52 permits the maintenance of proper coördination between the operation of the dies and the anvil.

Having described my invention, what I claim is:

1. In a sealing machine, the combination of a frame, a sealing device operably mounted on the frame, a package table movably supported on the frame for association with the sealing device, a treadle operably associated with the frame, levers operable by the treadle to move the package table into association with the sealing device, and actuating mechanism mounted on the frame and operable through a power stroke of the treadle to operate the sealing device at an increasing power factor.

2. A sealing machine comprising in combination a frame, a package table mounted for movement thereon, a sealing device supported on the frame, table shifting mechanism mounted on the frame and effective to move the table toward the sealing device with a quick movement, actuating mechanism mounted on the frame and effective to operate the sealing device under an increasing power factor, and a treadle associated with the frame and effective upon the table shifting mechanism and actuating mechanism to operate them in sequence.

3. In a sealing machine, the combination of a frame, a treadle associated therewith, a sealing device supported on the frame, a package table movably supported on the frame, table shifting mechanism supported on the frame for moving the table toward the sealing device, and operating mechanism for actuating the sealing device; said table shifting mechanism including a cam operable by the treadle on its power stroke to effect quick movement of the table, and the operating mechanism including an eccentric operable by the treadle on its power stroke and effective upon the sealing device at an increasing power factor.

4. In a sealing machine, the combination of a frame, a sealing device operably mounted thereon, a foot lever operably mounted on the frame, a toggle pivoted on the frame and operable to actuate the sealing device, an eccentric wheel mounted on the frame and operably connected with the toggle to operate the same, and means operable by the foot lever for rotating said wheel to actuate the toggle.

5. In a sealing machine, the combination with a frame, of a sealing device mounted thereon, a bifurcated bell crank lever pivoted on the frame, bearings fixed on the frame laterally of the sealing device, plungers operably mounted in said bearings, links connecting the respective bifurcate arms of the bell crank lever with the respective plungers in toggle relationship, a member forming a cross connection between the plungers, means movable with the plungers to operate the sealing device, and means for swinging the bell crank lever to straighten the toggle.

6. In a sealing machine, the combination of a frame, boss and bearing members supported thereon, a sealing chuck mounted in the boss and including coöperating sealing members, actuating plungers operably mounted in the bearing members, means for reciprocating the plungers, and means connected with the plungers for actuating the respective sealing members.

7. In a sealing machine, the combination of a frame member formed to provide boss and bearing members, an operable chuck removably mounted in the boss, actuating plungers operably mounted in the bearings, means for reciprocating the plungers, and means guided by the plungers for actuating the chuck.

8. In a sealing machine, the combination of a frame member formed to provide boss and bearing members, an operable chuck removably mounted in the boss, actuating plungers operably mounted in the bearings, means for reciprocating the plungers, and means guided by the plungers for actuating the chuck, said means being relatively adjustable.

9. In a sealing machine, the combination of a frame member formed to provide boss and bearing members, an operable chuck removably mounted in the boss, actuating plungers operably mounted in the bearings, means for reciprocating the plungers, and means guided by the plungers for actuating the chuck, said means being adjustable to vary its effectiveness upon the chuck.

10. In a sealing machine, the combination of a frame member formed to provide boss and bearing members, an operable chuck removably mounted in the boss, actuating plungers operably mounted in the bearings, means for reciprocating the plungers, and means connecting said plungers at the respective ends of the bearings and operably associated with the chuck.

11. In a sealing machine, the combination of a frame member formed to provide boss and bearing members, an operable chuck removably mounted in the boss, actuating plungers operably mounted in the bearings, means for reciprocating the plungers, and means connecting said plungers at the respective ends of the bearings and effective to operate the chuck upon movement of the plungers.

12. In a sealing machine, the combination of a frame having relatively fixed boss and bearing members, a chuck operably mounted in the boss, operating plungers movably mounted in the bearings, the chuck including coacting portions adapted to compress a closure, means carried by said plungers at one side of the bearings for actuating one of said coacting portions, means carried by said plungers at the other side of the bearings for actuating the other of said coacting portions, and means for actuating the plungers.

13. In a sealing machine, the combination of a frame, a chuck mounted thereon, said chuck including relatively movable die and anvil members, conjoined actuating members, one effective upon the anvil and the other upon the die, means for operating said actuating members, and a bearing supported on the frame and effective between said actuating members to afford them support and guidance relative to the chuck.

FREDERICK G. WIELAND.